June 21, 1932.   J. F. RUNKLE   1,863,639
TRANSMISSION DEVICE FOR AUTOMOTIVE VEHICLES
Original Filed April 16, 1928   3 Sheets-Sheet 1
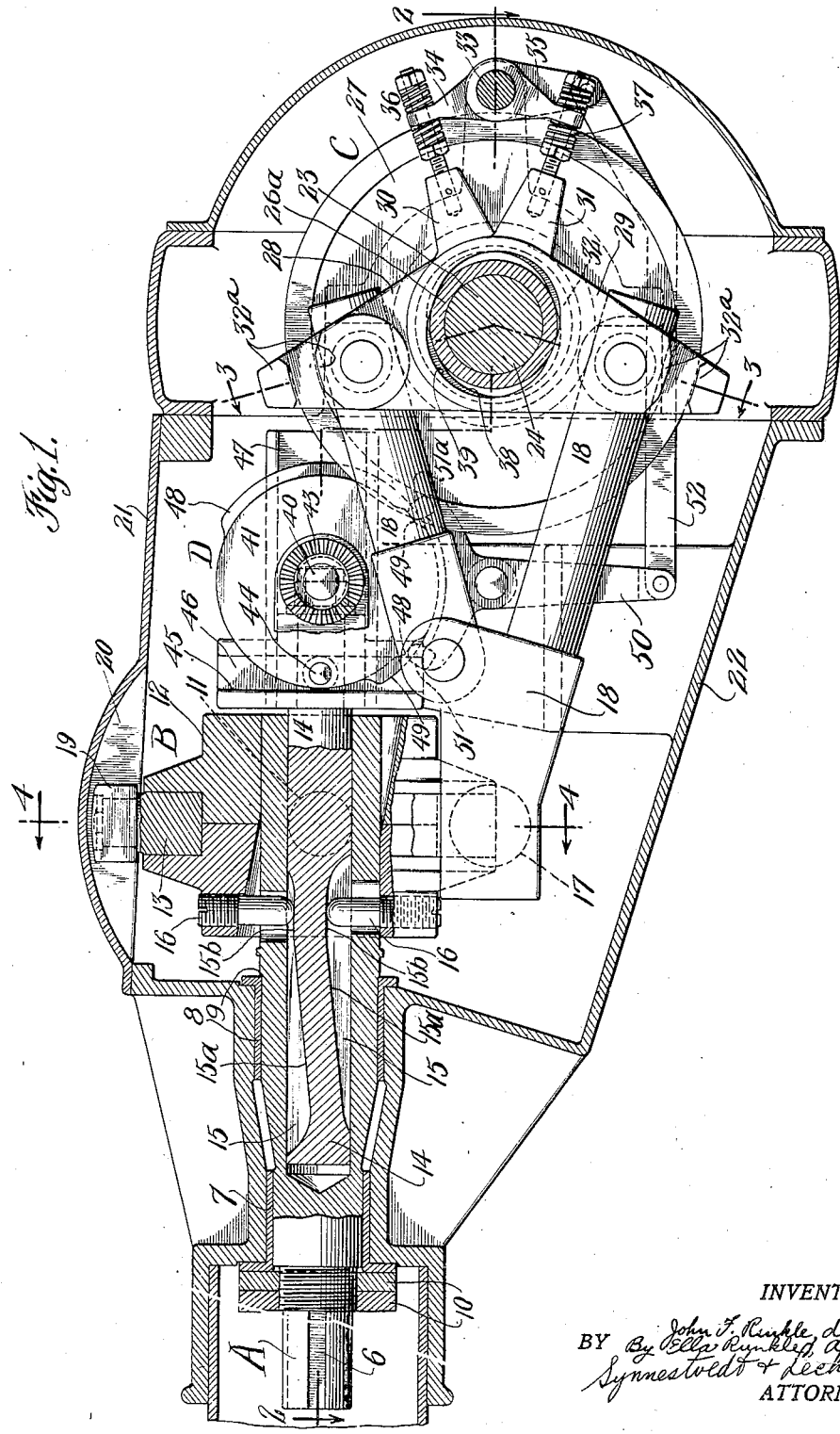
INVENTOR
BY John F. Runkle, deceased.
By Ella Runkle, admrx.
Synnestvedt & Lechner
ATTORNEYS June 21, 1932.  J. F. RUNKLE  1,863,639
TRANSMISSION DEVICE FOR AUTOMOTIVE VEHICLES
Original Filed April 16, 1928   3 Sheets-Sheet 2
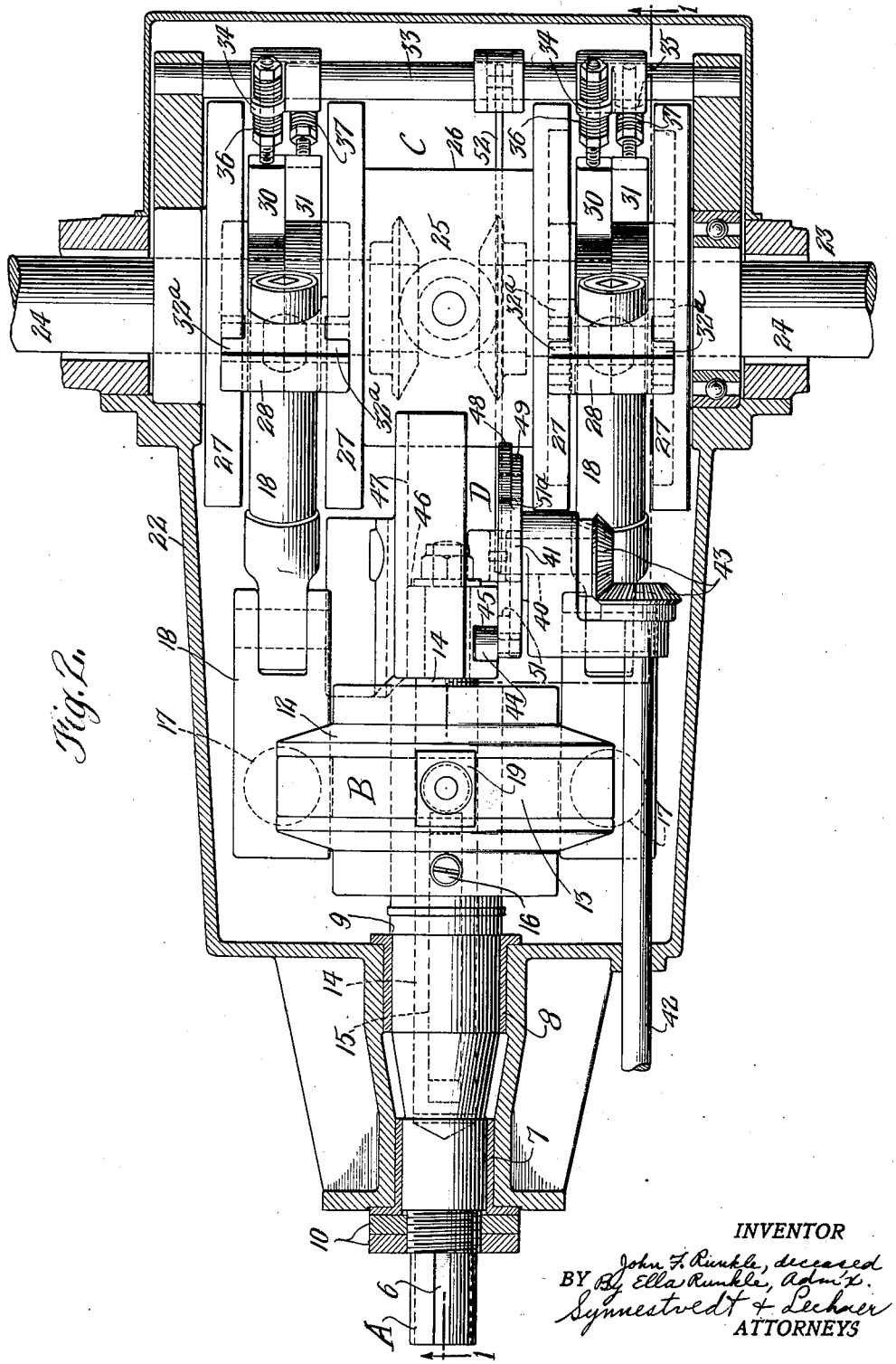
INVENTOR
John F. Runkle, deceased
BY Ella Runkle, Adm'x.
Synnestvedt & Lechner
ATTORNEYS

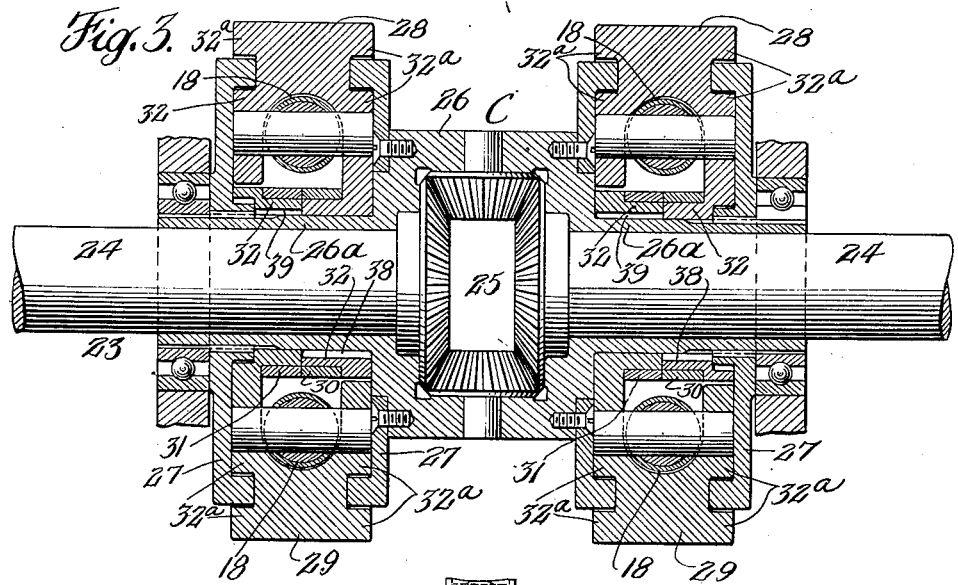
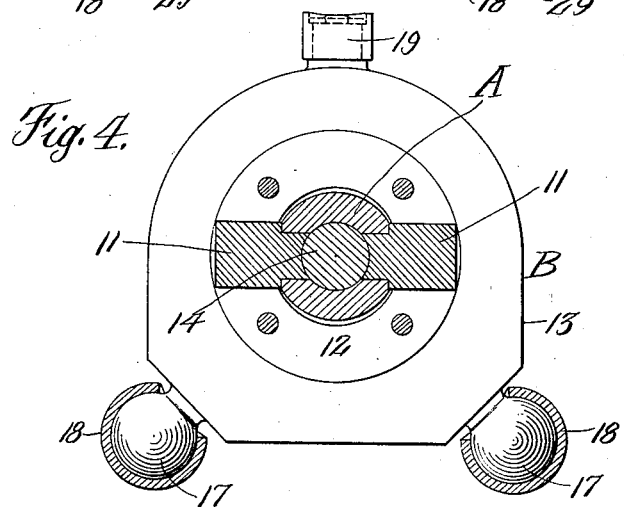
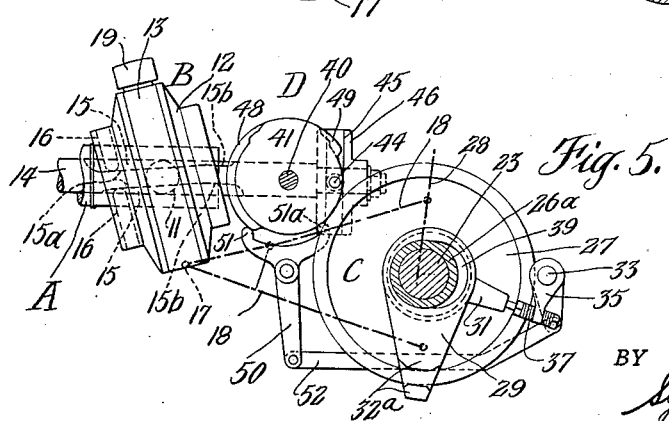

Patented June 21, 1932

1,863,639

UNITED STATES PATENT OFFICE

JOHN FRANK RUNKLE, DECEASED, LATE OF NEW YORK, N. Y., BY ELLA RUNKLE, ADMINISTRATRIX, OF NEW YORK, N. Y.

TRANSMISSION DEVICE FOR AUTOMOTIVE VEHICLES

Application filed April 16, 1928. Serial No. 270,405. Renewed September 2, 1931.

This invention relates to transmission devices and is particularly useful in connection with automotive vehicles such as automobiles and in connection with the latter the invention will be described.

One of the primary objects of this invention is the provision of a transmission device of very simple, compact and durable construction and one which employs considerably fewer parts than existing transmission devices.

Another object of the invention is the provision of a transmission device whereby the speed ratio between the driving means and the driven means may be varied without interrupting the flow of power from the driving means.

Still another object of the invention is the elimination of the change speed gearing and the clutch usually employed in transmission devices.

It is a further aim to provide a transmission device of such character as to make it possible to cut down the operating costs of automotive vehicles, to obtain greater and smoother acceleration of the vehicle, and to eliminate step by step speed changing.

How the foregoing together with such other objects and advantages as may hereinafter appear, or are incident to this invention, are realized, is illustrated in preferred form in the accompanying drawings, wherein:

Fig. 1 is a longitudinal section thru the transmission device taken substantially on the line 1—1 of Fig. 2 and with certain parts appearing in elevation and still other parts in partial elevation;

Fig. 2 is a plan view of Fig. 1 with the casing shown in section substantially on the line 2—2 of Fig. 1;

Fig. 3 is a fragmentary cross section taken on the line 3—3 of Fig. 1 with certain of the parts appearing in elevation;

Fig. 4 is a cross section taken on the line 4—4 of Fig. 1 with a swash plate or ring which is employed shown in face view; and Fig. 5 is a diagrammatic view showing a certain operating position of the device.

Referring to the drawings it will be seen that in general the transmission device comprises a drive shaft A, a swash plate device indicated as a whole by the reference letter B, an axle driving mechanism indicated as a whole by the reference letter C, and a manually operable control device D.

The drive shaft A in this instance is connected by means of a spline connection at 6 to a propeller shaft (not shown) leading back from the engine, the usual universal joints being associated with the propeller shaft. Suitable bearings 7 and 8 are provided for the drive shaft which shaft is held against end play by means of the shoulder 9 contacting with the bearing 8 and the lock nuts 10 contacting with the bearing 7. The lock nuts 10 may be adjusted to take up any end play which may develop.

Trunnions 11, 11 are provided on the shaft A (see Fig. 4) which drive a swash plate carrier 12 of the swash plate device B. The device B comprises the carrier 12, and a swash plate or ring 13, thru the medium of which the rotary movement of the shaft A may be converted into a reciprocatory movement for the purposes to be hereinafter described. The device B is shown in its neutral position in Fig. 1 in which position the swash plate or ring 13 is maintained at right angles to the drive shaft A and therefore does not transmit any reciprocatory movement. In Fig. 5 the swash plate device B is illustrated as being tilted to its extreme angular position, in which position maximum length reciprocations are obtained.

One of the functions of the control device D is to tilt the swash plate device B and by means of this control device it is possible to tilt the device B to all angles from the zero angle shown in Fig. 1 to the maximum angle shown in Fig. 5 whereby the length of the reciprocations may be altered at will to control the speed of the axle driving device C as will further appear.

The tilting is accomplished by means of the control bar 14 which slides endwise inside of the driving shaft A and is provided with cam grooves 15 having inclined surfaces 15a, 15a cooperating with the pins 16, 16 of the carrier 12 to tilt the carrier with its swash plate on the trunnions 11, 11, as endwise movement is imparted to the bar 14. The bar 14 rotates with the shaft A by virtue of the pins 16 entering in the grooves 15.

The swash plate or ring 13 is provided with two balls 17, 17 spaced 90° apart (see Fig. 4) for the connecting rods 18, 18 thru the medium of which the action of the swash ring 13 is transmitted to the axle mechanism C. These balls are located equidistant from the center line of the swash ring 13 and at the lower portion thereof, and at the upper portion of this ring there is provided a swivel guide block 19 adapted to ride back and forth in the longitudinal guideway 20, in this instance formed in the cover plate 21 of the transmission device housing 22. Thus it will be seen that the swash plate 13 is prevented from rotating with its carrier 12.

Before describing the manner of controlling the swash plate, the axle driving mechanism C will be described, as there is a certain relation between the control of the swash plate device to the control of the axle driving mechanism which forms an important part of this invention.

The axle 23 in this instance the rear axle of the vehicle comprises the two aligned shafts 24, 24 differentially connected by means of any suitable form of differential device 25, here shown of the bevel gear type. The differential housing 26 is provided with the tubular extensions 26a 26a through which the shafts 24 pass and which constitute bearings for these shafts at this point. Two pairs of driving discs 27, 27 are secured to the housing 26, one pair to each side of the differential gearing, the rotative movement of which is communicated to the axle shaft through the medium of the differential gearing.

Rotative movement is imparted to the driving discs 27, by means of the driving or driver arms 28 and 29, in turn operated by the connecting rods 18, there being a pair of driver arms 28 and 29 for each pair of driving discs. Broadly stated the movement of the swash plate is transmitted to the driving arms by the connecting rods which cause them to swing backwards and forwards alternately gripping and releasing the rims of the driving discs 27 and thus transmitting rotary motion to said driving discs and the axle. The manner of controlling the driving arms and the mechanism employed to cause such gripping and releasing will now be described.

It is here pointed out that the driving arms and their associated parts for each of the pairs of driving discs 27, 27 are the same therefore only one set will be described.

Referring more particularly to Figs. 1, 2 and 3 in connection with a detailed description of the axle driving mechanism C, it will be seen that the driving arms 28 and 29 are substantially oppositely disposed and are provided with the connecting rod members 30 and 31 respectively, which engage the arms at their hub portions 32. The members 30 and 31 straddle the arm hubs and the driving arms are adapted to be rocked back and forth on these members 30 and 31 as fulcrums. In Fig. 1 the connecting rod members are shown in their neutral position in which position the fulcrum points of the driving arms 28 and 29 fall on the axial center line of the axle 23 and the arms are radially disposed about the center of the driving discs. In this position the gripping jaws 32a of the driving arms are clear of the driving discs 27 and the discs are free to rotate.

When it is desired to rotate the axle the driving arms are moved so that they are no longer radially disposed with respect to the driving discs, by moving the fulcrum points of the levers to one side or the other of the center of the discs which causes the jaws to grip the driving discs, the gripping however only occurring in one direction of the movement of the driving arms, according to the direction in which the arms are shifted.

Assuming now that it is intended to rotate the axle in an anti-clockwise direction, the rock shaft 33 is rocked in an anti-clockwise direction which moves its upper arm 34 to the left and its lower arm 35 to the right which in turn moves the connecting rod members 30 and 31 thru the medium of the stud and spring connections 36 and 37, the member 30 being moved to the left and the member 31 being moved to the right. The stud and spring connections 36 and 37 provide for a small amount of movement of the driving arms to allow them to grip and release. The reaction of these spring connections on the arms 34 and 35 is balanced and there is no tendency to rotate the rock shaft. As these members 30 and 31 straddle the driving arm hubs the driving arms are moved therewith, which arms are provided with elongated openings 38 and 39 respectively to permit such movement. Thus it will be seen, that the fulcrum point of the driving arm 28 is moved to the left of the driving disc center, which causes the jaws 32a thereof to grip the disc when this driving arm is rocked to the left, and to slide freely on the disc when it is rocked to the right; and the fulcrum point of the driving arm 29, is moved to the right of the driving disc center, which causes the jaws 32a thereof to grip the disc when this arm is rocked to the right, and to slide freely on the disc when it is rocked to the left. The operation of the other set of driving arms is exactly the same it being here pointed out however that owing to the peculiar motion of the swash plate device B as one driving arm of one set approaches the end of its gripping stroke, a driving arm of the other set starts on its gripping stroke so that there is an overlap whereby a continuous rotary motion is imparted to the discs and consequently to the axle. If the rock shaft 33 is rocked in a clockwise direction the driving arms 28 and 29 are tilted in the opposite directions, that is, the fulcrum point of the arm 28 is moved to the right of the axle center and the fulcrum point of the arm 29 is moved to the left, which causes the axle to be driven in a clockwise direction and the car runs backwards. In this connection it is pointed out that with the swash plate in its neutral position and the rock shaft in its position for forward speed, the driver arms are held in such position as to allow the driving discs to run free when rotating in an anti-clockwise direction but will hold the discs if they should tend to turn in the opposite direction, thus holding the car against backward rolling.

Reverting now to the control device D it will be seen that it comprises a shaft 40 carrying the cam disc 41 which may be rotated back and forth by any suitable means, as for example, by means of a hand lever working on a quadrant on the steering column and actuating the shaft 42 connected by means of bevel gearing 43 with the cam shaft 40. The cam disc 41 carries a crank pin 44 which engages a slot 45 in the block 46 which is carried at the end of the control bar 14 and guided in the guideway 47 the control bar 14 being rotatable in and participating in the adjustment of block 46. The cam disc 41 is also provided with two cam surfaces 48 and 49, side by side, on its periphery, the cam surface 48 acting on the double bell crank 50 at point 51, to throw the lower end of the bell crank to the right and the cam surface 49 acting on the bell crank at point 51a to throw it to the left. This movement is transmitted to the rock shaft 33 and connecting rod members 30 and 31 by the link 52. The disc 41 therefor controls the swash plate thru the medium of the crank pin 44 and the axle driving mechanism thru the medium of the cam surfaces and bell crank lever 50.

With the parts in the position shown in Fig. 1 if the cam disc 41 is rotated clockwise a small distance (about 10°) the driving arms will assume their position for forward drive, the swash plate however will not be tilted because of the horizontally extending portions provided at 15b on the inclined surfaces 15a of the control bar 14. These horizontally extending portions are sufficiently long to allow the above 10° of movement plus approximately 20° more of movement on each side of neutral so that the swash plate may be brought from its tilted position to neutral position from either reverse or forward while the driving arms are still in driving position. In this connection it is pointed out that the cam surfaces on the cam disc 41 are so proportioned that approximately 10° movement of the disc may take place before actuation of the lever 50. In this 10° movement of the disc, the amount of movement imparted to the control bar 14 is very slight, as will be seen from an inspection of Fig. 1. On moving the disc 41 approximately 20° further, the bar 14 will be moved to an amount bringing the starting point of the inclined surfaces 15a opposite the pins 16.

Further rotation of the cam disc in a clockwise direction causes the control bar 14 to tilt the swash plate until its maximum position is reached at the bottom of the slope of the inclined surfaces 15a when going into high speed forward or half way down when in reverse, the rotation of the disc for reverse of course being in an anti-clockwise direction. It is pointed out that movement of the cam disc is limited in its clockwise direction to about 180° and in its other direction to about 90°, and, therefore, full stroke is given to the control bar 14 for forward speeds and approximately one-half stroke for reverse speeds.

The following is a brief description of the manner of operating an automobile equipped with this improved device.

Assuming the car to be standing still with the parts in neutral as shown in Fig. 1 and with the engine idling, the engine is accelerated and the control lever on the quadrant is moved in the direction for forward speed which first causes the driving arms to tilt to driving position and then causes the swash plate to tilt after which the control lever and gas lever may be advanced at a rate according to the speed at which it is desired to drive the car. If it is desired to coast, the control lever is brought back to neutral which allows the car to roll. If it is desired to use the axle driving mechanism as a brake the control lever is brought to the 10° position which holds the driving arms in driving position to act as a lock against rotative movement of the driving discs. For reverse the operation is similar, the control lever of course being moved in the opposite direction.

From the foregoing it will be seen that a transmission device is provided which eliminates the transmission gear set with its operating lever usually employed, and also eliminates the clutch. In the present device changes of speed are obtained without the usual step by step changing of gears in consequence of which the loss of speed while changing gears is eliminated. In addition it is to be noted that the usual master ring gear and bevel pinion at the rear axle are also eliminated. Economy in gasoline is afforded by using a lower ratio of engine speed, to rear axle speed, when running on the level and by selecting the exact ratio necessary to drive the car with the engine under full load on a grade. Greater acceleration from a starting point is also made possible by this invention.

The automobile may be locked against movment while standing on a grade either up or down without the use of a hand brake, although a hand brake may be employed if desired.

The working parts of the device may be lubricated by flooding lubricant over the parts as by means of an oil pump, preferably located in the lower portion of the housing 22 and driven by means of suitable gearing from the drive shaft 6.

What is claimed is:

1. A transmission device for automotive vehicles comprising in combination, a drive shaft, a variable swash plate driven thereby, a driven shaft, means for driving said driven shaft operated by said swash plate, the speed of rotation of the driven shaft being altered with respect to the speed of rotation of the drive shaft as the position of the swash plate is varied, said means for driving the driven shaft including a rimmed disc secured to the driven shaft, levers for gripping the rim of said disc, movable mountings on which said levers are fulcrumed, means for moving said mountings from positions in which the fulcrums of the levers are coaxial with the axis of the driven shaft and disc to positions in which said fulcrums are offset from the axis of the driven shaft and disc, and rods connecting said gripping levers to said swash plate.

2. In transmission mechanism for motor vehicles, a drive shaft, a swash plate device rotatable with and adjustable on the shaft, a pair of driven shafts, a housing in which the driven shafts are co-axially mounted, differential gearing carried by and operatively connecting the housing and driven shafts, rimmed disks secured on the housing, jaws to grip the disk rims having an adjustable fulcrum support on the housing whereby the fulcrum of the jaws are shaped to be arranged co-axially of the driven shafts to render the jaws inactive to grip the disk rims and eccentrically of the driven shafts to render the jaws active to grip the disk rims, and said jaws having an operative connection with and actuated from the swash plate device, and means to effect adjustment of the fulcrum support of the jaws and of the swash plate device in successive sequence to the adjustment of the fulcrum support of the jaws to actuate the jaws.

3. In transmission mechanism for motor vehicles, a drive shaft, a swash plate device mounted on said shaft to have adjustment in angular relation to the axis thereof, a cam bar mounted in a bore in the shaft to have axial sliding adjustment, means carried by the swash plate device extended through perforations in the wall of the bore in the shaft to engage the cam member to couple the swash plate device and cam bar with the shaft and effect adjustment of the swash plate device by the adjustment of the cam bar, an axle assembly embodying a housing carrying rimmed disks and a pair of driven shafts rotatably mounted in the housing in co-axial relation and having a differential gear connection with the housing, jaws to oscillate about the driven shafts operatively connected with the swash plate device to effect oscillation thereof by the rotation of the swash plate device and adapted to grip the disk rims to effect rotation of the housing and shafts during the oscillation thereof, fulcrum supports for the jaws adjustably mounted upon the housing adapted to arrange the fulcrum of the jaws co-axially with the axis of the driven shafts to render the jaws inactive to grip the disk rims during the oscillation thereof and arrange the fulcrum of the jaws eccentric to the axis of the driven shafts to render the jaws active to grip the disk rims during the oscillation thereof, and means to effect adjustment of the fulcrum supports for the jaws to render the jaws inactive to grip the disk rims and the cam bar in successive sequence thereto to adjust the swash plate device to neutral position, and to render the jaws active to grip the disk rims and the cam bar in successive sequence thereto to variably adjust the swash plate and vary the oscillatory movement of the jaws.

4. In transmission mechanism for motor vehicles, a drive shaft, a swash plate device mounted on the shaft to have adjustment in angular relation to the axis of the shaft, a cam bar mounted in a bore in the shaft to have adjustment axially of the shaft, means to couple the swash plate device and cam bar to the shaft and operatively connect the swash plate device with the cam bar to effect adjustment thereof by the adjustment of the cam bar, an axle assembly embodying a housing carrying disks and a pair of rotatable shafts co-axially mounted in the housing having a differential gear connection with the housing, oscillatory jaws having adjustable fulcrum supports on the housing to oscillate about the shafts, the fulcrum supports of which jaws are adapted to be adjusted to arrange the axes thereof eccentrically of the axis of the shafts to render the jaws active to grip and rotate the disks with the associated housing and shafts as the jaws are oscillated and adjusted to arrange the axes co-axial of the shafts to render the jaws inactive to grip the disks as the jaws are oscillated, means to connect the jaws with the swash plate device to transmit the rotary movement of the latter to oscillatory movement of the jaws, and means connected with the fulcrum supports of the jaws and cam bar to adjust the jaws to active and inactive positions and in successive sequence therewith the cam bar to adjust the swash plate device to neutral position and to position to oscillate the jaws.

5. Transmission mechanism for motor vehicles as claimed in claim 4, wherein the means connected with the fulcrum supports of the jaws and the cam bar to effect adjustment thereof comprises lever mechanism connected with the fulcrum supports, a rotatable disk arranged with cams having an operative connection with the lever mechanism, and an eccentric connection between said disk and the cam bar.

6. Transmission mechanism for motor vehicles as claimed in claim 4, wherein the means connected with the fulcrum supports of the jaws and the cam bar to effect adjustment thereof comprises a rock shaft carrying arms connected with the fulcrum supports of the jaws, a rotatable disk arranged with a pair of cams, a double bell crank lever having a link connection with an arm on the rock shaft, one cam by the rotation of the disk being adapted to co-operate with one lever arm to adjust the fulcrum supports of the jaws to render the jaws inactive and the other cam to co-operate with the other arm of the lever to adjust the fulcrum supports of the jaws to render the jaws active, and a pin fixed eccentrically in the disk engaging an annular slot in a block connected with the cam bar to effect adjustment of the latter in successive sequence with the adjustment of the fulcrum supports of the jaws.

7. Transmission mechanism for motor vehicles as claimed in claim 4, wherein two pairs of disks are carried by the housing of the axle assembly, and a pair of oppositely disposed jaws co-operate with each pair of disks, and the means connected with the fulcrum supports of the jaws and the cam bar to effect adjustment thereof comprises a rock shaft carrying two pairs of oppositely extending arms, one arm of each pair of arms being connected with a fulcrum support of a jaw of one pair of jaws and the other arms with the other jaws of each pair of jaws, a double bell crank lever having a link connection with an arm on the rock shaft, a rotatable disk arranged with a pair of cams one cam by the rotation of the disk being adapted to co-operate with one arm of the lever to adjust the fulcrum supports of the jaws to render the jaws inactive and the other cam to co-operate with the other arm of the lever to adjust the fulcrum supports of the jaws to render the jaws active, and a pin fixed eccentrically in the disk engaging an annular slot in a block connected with the cam member to effect adjustment of the latter in successive sequence with the adjustment of the fulcrum supports of the jaws.

In testimony whereof, I have hereunto signed my name.

ELLA RUNKLE,
*Administratrix of the Estate of John Frank Runkle, Deceased.*